Nov. 1, 1955 — L. A. MAPES — 2,722,354
BOTTLE HANDLING APPARATUS
Filed June 26, 1951 — 3 Sheets-Sheet 1
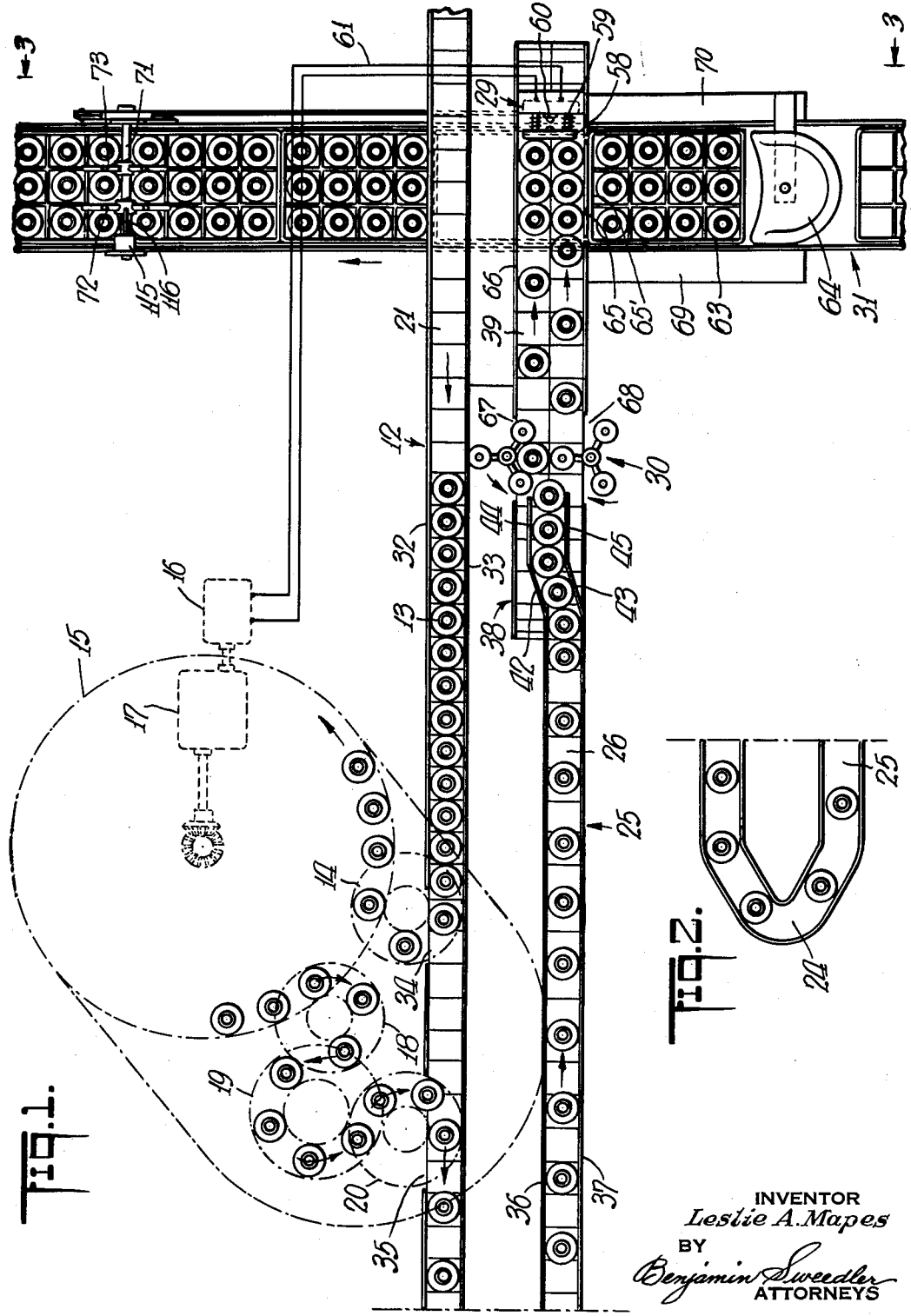
INVENTOR
Leslie A. Mapes
BY
Benjamin Sweedler
ATTORNEYS Nov. 1, 1955  L. A. MAPES  2,722,354
BOTTLE HANDLING APPARATUS
Filed June 26, 1951  3 Sheets-Sheet 2
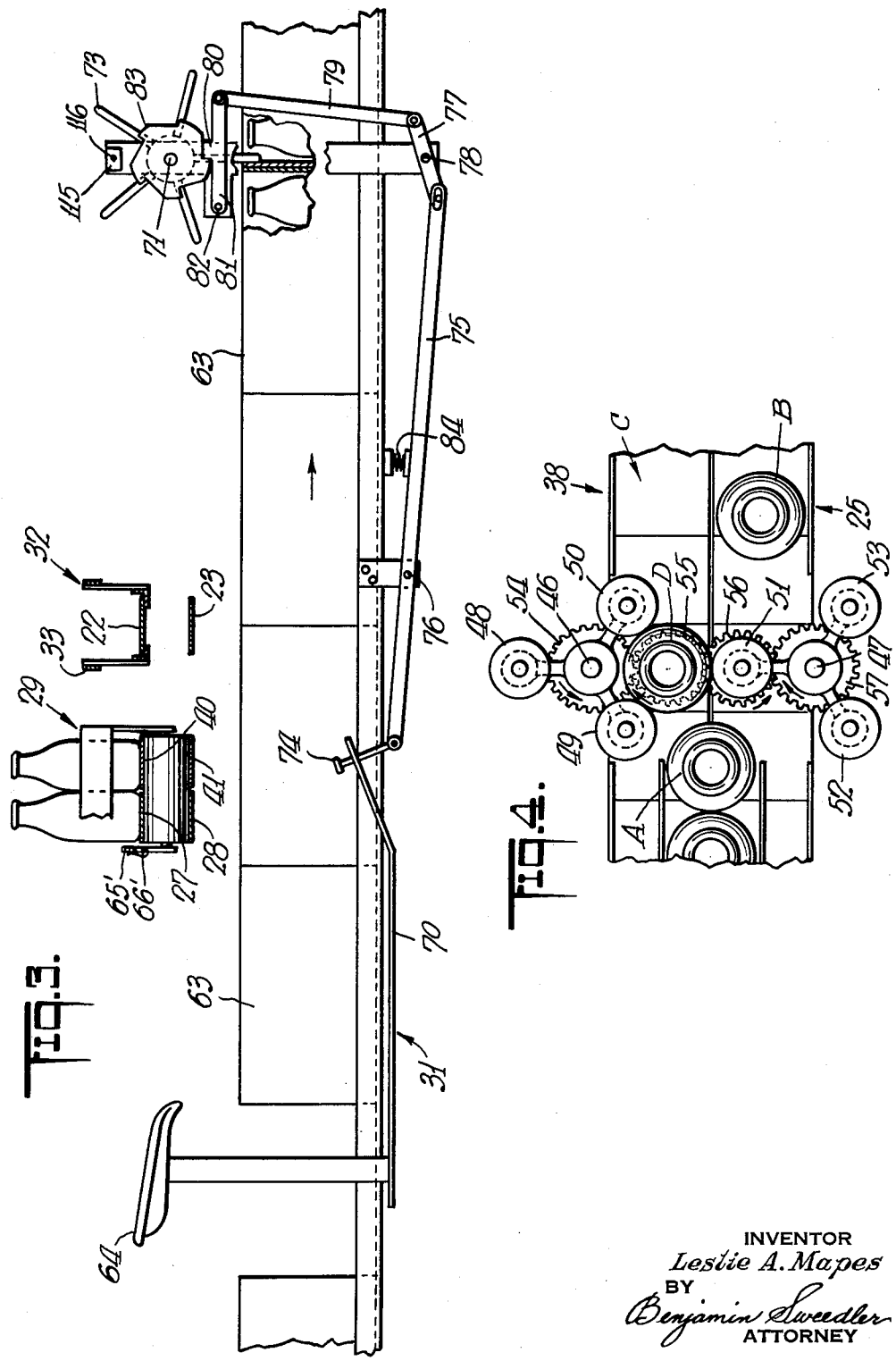
INVENTOR
Leslie A. Mapes
BY
Benjamin Sweedler
ATTORNEY

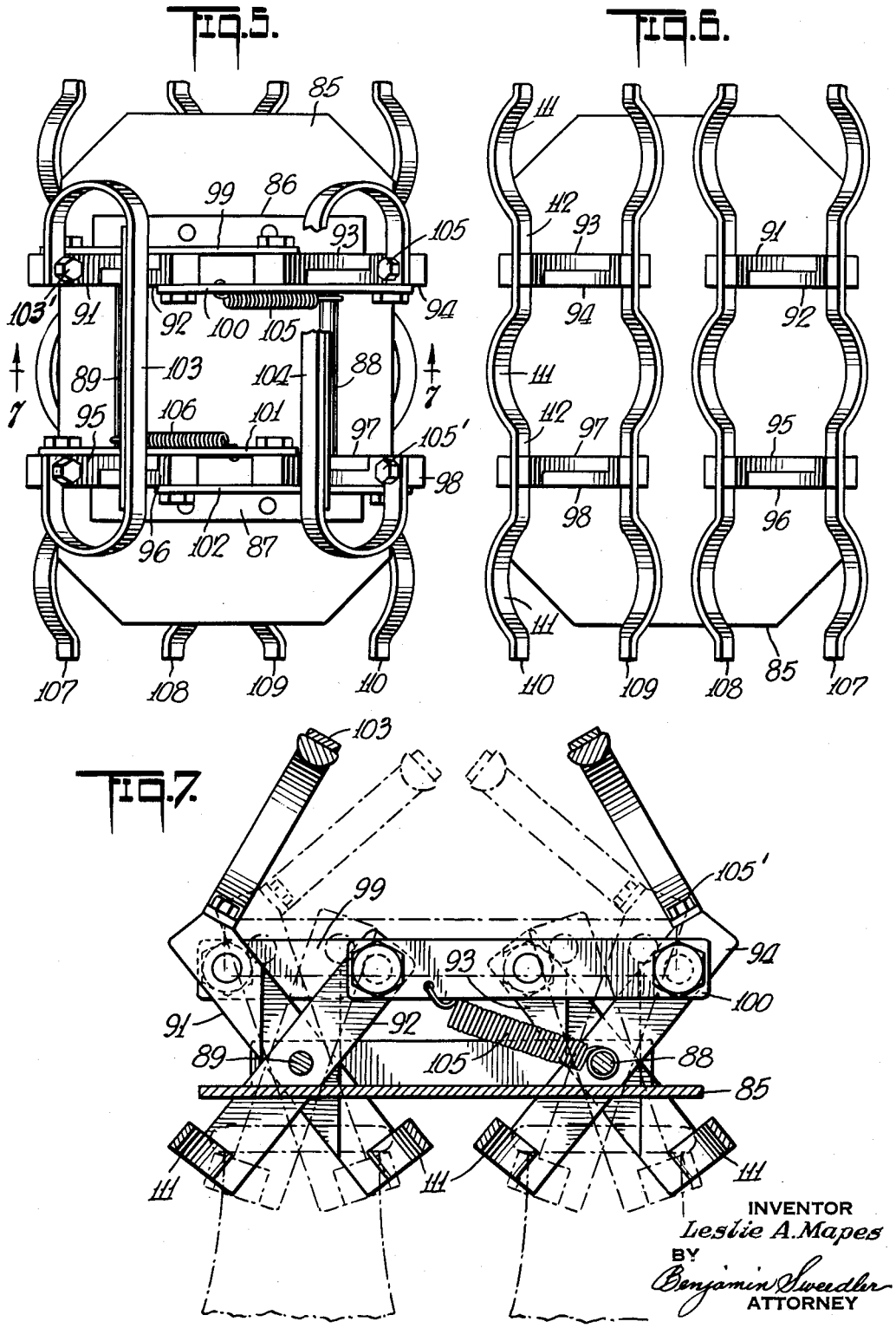

United States Patent Office 2,722,354
Patented Nov. 1, 1955

2,722,354

BOTTLE HANDLING APPARATUS

Leslie A. Mapes, Palisade, N. J.

Application June 26, 1951, Serial No. 233,611

5 Claims. (Cl. 226—14)

This invention relates to bottle handling apparatus, and more particularly to milk bottle handling apparatus facilitating the placement of filled and capped milk bottles in cases, cartons or boxes, hereinafter referred to as cases, containing a plurality, usually 12, bottles in upright position.

It is among the objects of this invention to provide bottle handling apparatus which in operation minimizes breakage of glass bottles, facilitates the placing of the bottles in cases, each containing a multiplicity of bottles, usually 12, and which results in a saving of labor and also time, i. e., speeds up the operation of placing the bottles in the cases.

Other objects and advantages of this invention will be apparent from the following detailed description thereof.

In the preferred embodiment illustrated on the drawings the invention is shown incorporated in a milk bottle handling machine in which the bottle conveyors and the case conveyor travel in a direction at right angles to each other and the description which follows will largely be confined to the present illustrated embodiment of the invention. It will be understood, however, that the novel features and improvements are susceptible to other applications, such, for example, as apparatus for handling other bottles than milk bottles and apparatus in which the case conveyor and the bottle conveyors travel in a direction parallel to each other. Hence, the scope of this invention is not confined to the embodiment herein described.

In accordance with this invention the bottles are fed from the capping mechanism by a conveyor, one bottle in back of another, i. e., in a single row, to a bottle transfer mechanism which moves alternate bottles of the row to form two parallel rows of bottles. The second row of bottles thus formed is moved by a second bottle conveyor disposed parallel and contiguous to the first-mentioned bottle conveyor. A stop mechanism is associated with these two bottle conveyors to stack the bottles and produce a grouping or pattern of any desired number, say six consisting of two rows of three bottles each, which grouping or pattern fits half of a case designed to hold 12 bottles. The bottle grouping can, of course, be varied to accommodate cases holding more or less than twelve bottles.

The stop mechanism is so designed that, should the pressure thereon exceed a predetermined pressure caused by the accumulation of too many bottles, it automatically functions to stop the filling and capping mechanism and the supply of filled and capped bottles to the transfer mechanism.

A case conveyor is arranged to move empty cases in a plane beneath the plane in which the bottle conveyors move. The cases are brought by this case conveyor into close proximity to the aforementioned stop mechanism with each case positioned at a lower level than the accumulation of bottles contiguous to the stop mechanism. An operator station is disposed near the stop mechanism. Under the foot control of the operator is a mechanism for stopping or permitting movement of the cases on the case conveyor.

A special lifter mechanism is arranged to firmly engage and hold the grouping or pattern of bottles abutting the stop mechanism. With the relative arrangement of the bottle conveyors and case conveyor hereinabove described, the operator need only close the handle grips of the lifter, and move the desired pattern of bottles thus firmly held by the lifter forward and downwardly into the case to transfer this grouping of bottles into the case. These motions need be repeated once, employing a grouping of six bottles to fill one case designed to hold twelve bottles.

In the accompanying drawings forming a part of this specification and showing for purposes of exemplification a preferred embodiment of this invention without limiting the claimed invention to this embodiment, Figures 1 and 2 show a fragmentary plan of a bottle handling machine embodying this invention;

Figure 3 is a side elevational view partly in section of the apparatus of Figure 1 taken in the direction indicated by the arrows 3—3 on Figure 1;

Figure 4 is a fragmentary plan view showing the transfer mechanism for effecting movement of alternate bottles of a single row of bottles to form two rows of bottles;

Figure 5 is a top plan view of the special lifter mechanism for lifting a grouping or pattern of bottles;

Figure 6 is an inverted or underside plan view of the lifting mechanism of Figure 5; and Figure 7 is a vertical section taken in a plane passing through line 7—7 on Figure 5.

In the drawings 12 indicates a conveyor for feeding empty bottles 13 from a washing machine (not shown) to a bottle transfer mechanism 14 which supplies the bottles to a filler 15 driven by a motor 16 through reduction gearing 17. The filled bottles are moved from the filler 15 by a transfer mechanism 18 and fed one by one to a capper 19. The capped bottles from the capper 19 are fed by a transfer mechanism 20 to the conveyor 12. The transfer mechanisms 14, 18 and 20 may be of any well known type, such as, for example, a rotary plate conveyor or turret. The filler 15 and the capper 19 may be of any conventional type employed in the bottle filling and capping art. Accordingly, it is believed further description of these parts is unnecessary.

Conveyor 12 may consist of flat rectangular plates 21 pivoted to each other and thus forming an endless belt consisting of two horizontal passes 22, 23 (Figure 3) on the upper of which passes the bottles rest. Movement of this conveyor, which may be motor driven in any well known manner, carries the bottles resting thereon to a transfer chute 24 (Figure 2). The bottles move through this chute 24 desirably by the momentum imparted thereto by conveyor 12, or by one bottle forcing the succeeding bottle therethrough on to a conveyor 25 consisting of flat rectangular plates 26 pivoted to each other and thus forming an endless belt having an upper pass 27 and a lower pass 28 (Figure 3). Conveyor 25 extends from chute 24 to a point just beyond a stop mechanism 29 hereinafter more fully described.

The arrangement of conveyors 12 and 25 shown in Figures 1 and 2 of the drawings is employed when the floor space available does not permit disposition of the transfer mechanism 30 and case conveyor 31, which transfer mechanism and case conveyor are hereinafter more fully described, at a point just beyond the capped bottle transfer mechanism 20, i. e., in the embodiment of the invention shown in Figure 1 just to the left of the transfer mechanism 20. Where, however, the floor space is available, the transfer mechanism 30 may be disposed to receive capped bottles fed thereto by a conveyor corresponding to conveyor 12 and the case conveyor 31 disposed beneath and at right angles or parallel to this conveyor. In the latter event the conveyor 25 or its equivalent can be eliminated.

Conveyor 12 is provided with spaced parallel guide rails 32, 33. Guide rail 32 is interrupted at 34 (Figure 1) to permit transfer of the empty bottles by mechanism 14 to the filler 15. This guide rail is also interrupted at 35 to permit movement of the capped bottle by the transfer mechanism 20 on to the conveyor 12. Conveyor 25 is provided with guide rails 36 and 37.

A second bottle conveyor 38 desirably constituted of rectangular plates 39 pivoted to each other is disposed contiguous to conveyor 25. This second conveyor 38 extends from a point just before the transfer station 30 to just beyond the stop mechanism 29, as shown in Figure 1. It consists of two passes 40, 41, which, as clearly shown in Figure 3, lie in the same horizontal planes as the passes 27 and 28, respectively, of conveyor 25. One longitudinal edge of upper pass 40 of conveyor 38 abuts a longitudinal edge of upper pass 27 of conveyor 25 as shown in Figure 3 to provide a flat plane surface on which the milk bottles can be moved.

Inclined guide rails 42, 43 extend from the guide rails 36, 37, as shown in Figure 1, and serve to guide the row of bottles moved by conveyor 25, so that the bottles rest on the upper passes of both conveyors 25 and 38, i. e., the resultant row of bottles is disposed so that its longitudinal axis is substantially coincident with the longitudinal meeting line of conveyors 25 and 38. Guide rails 42 and 43 lead into guide rails 44, 45 which maintain the bottles in the relative position shown in Figure 1 as they enter the transfer mechanism 30.

Transfer mechanism 30, as best shown in Figure 4, comprises two vertically extending rotatable shafts 46, 47. Shaft 46 has fixed thereon three arms spaced 120 degrees apart. Rolls 48, 49 and 50, desirably of rubber or other material which will not damage the bottle, are carried by these arms. In like manner, shaft 47 has fixed thereon three arms spaced 120 degrees apart on which arms are mounted the bottle engaging rolls 51, 52 and 53. The rolls 51, 52 and 53 are positioned about the shaft 47 relative to the position of rolls 48, 49 and 50 on shaft 46, as shown in Figures 1 and 4, so that for every 60 degrees of rotation a bottle is moved from the position indicated by the reference character A, Figure 4, to the position indicated by reference characters B or C, Figure 4, i. e., from a position straddling the contiguous conveyors 25, 38 to a position on one or the other of these two conveyors in the continued travel thereof past the transfer mechanism 30.

Actuation of the transfer mechanism 30 is effected by the forward motion of the bottles fed by conveyor 25. The two shafts 46 and 47 are interconnected for rotation in opposite directions by a gear 54 keyed to shaft 46 and meshing with a gear 55, which in turn meshes with a gear 56 meshing with a gear 57 keyed to shaft 47. Gears 55 and 56 are mounted on suitable shafts. Since shafts 46 and 47 rotate in opposite directions, the bottle engaging rolls 48, 49, 50 on the one hand and the rolls 51, 52 and 53 on the other hand also rotate in opposite directions. Thus, viewing Figure 4, as the shafts 46 and 47 rotate, the bottle indicated by the reference character D, which is confined between the rolls 49, 50 and 51, is caused to move on to the conveyor 38 into the position indicated by the reference character C. The next bottle A in the continued movement of the conveyors will be confined between the bottle engaging rolls 49, 51 and 52 and will be moved to position B. Thus, alternate bottles as they are fed into and through the transfer mechanisms 30 by conveyor 25 are moved on to the upper pass of conveyor 25 and the remaining bottles are moved on to the upper pass of conveyor 38 forming two parallel rows of bottles. Should an excessive number of the bottles accumulate against the stop mechanism 29, the bottles can back up through the transfer mechanism 30 because the bottle engaging rolls 48 to 53, inclusive, are actuated by the moving bottles only and can rotate in either clockwise or counterclockwise direction, the rolls 48 to 50, inclusive, rotating in the opposite direction from the direction of rotation of rolls 51 to 53, inclusive.

The bottles are thus disposed in two rows in parallel relationship on the upper passes 27 and 40 (Figure 3), which passes move at the same speed.

Extending across passes 27 and 40 near the terminal end of these passes is the stop mechanism 29. This stop mechanim desirably is in the form of a spring pressed plate 58 (Figure 1) against which the leading bottles abut. When the pressure of the bottles against plate 58 exceeds a desired predetermined pressure, determined by the tension exerted by springs 59, a switch 60 in power line 61 leading to the motor 16 is actuated to effect interruption of the power to motor 16. When this switch is thus actuated, operation of the filler 15 and capper 19 is interrupted. Hence, the supply of capped and filled bottles to conveyors 12, 25 and 38 ceases. When the pressure on the plate 58 falls below this predetermined pressure, switch mechanism 60 is actuated to close the circuit including the power lines leading to motor 16 with the consequent actuation of the filler 15 and the capper 19.

The capped and filled bottles are in frictional contact with the upper passes 27, 40 of the conveyors 25, 38, respectively, and are carried thereby into contact with the plate 58 of the stop mechanism 29. The bottles thus accumulate in two parallel rows against the plate 58. In the case of one quart milk bottles an arrangement of two rows of three bottles each represents a desirable pattern or grouping of bottles which can readily be transferred to a case employing two movements of the lifter mechanism to fill a 12 bottle case. It will be understood the invention is not limited to an arrangement or pattern of 6 bottles in two rows of three each, but that by employing additional conveyors and transfer mechanisms corresponding to mechanism 30, other desired groupings of bottles can be utilized.

Disposed beneath the lower passes of the conveyors 12, 25 and 38 and traveling in a direction at right angles to the direction of travel of these conveyors is the case conveyor 31. This case conveyor may also be of pivoted plate construction and be constituted of two passes on the upper of which cases 63 rest and are thus carried thereby. An operator's seat or station 64 (Figures 1 and 3) is disposed just above the case conveyor 31 in a position close to and in front of the stop mechanism 29.

Guide rail 37 of the conveyor 25 is interrupted to provide an opening 65 directly opposite the operator's station 64. This opening is of a length slightly in excess of the distance occupied by three bottles; thus, two rows of three bottles each can be readily moved through opening 65 into the case 63 therebeneath. Desirably a plate 65' is hinged at 66' adjacent conveyor 25 in the vicinity of opening 65. This plate is of a length equal to the length of opening 65 and of a height to extend a short distance above the upper pass 27 of conveyor 25. Plate 65' functions as a stop or guard to prevent bottles falling from conveyor pass 27 through opening 65. Plate 65' is spring hinged so that when the operator moves the bottles through opening 65 the plate automatically moves about its hinge to permit the bottles to pass. As soon as the bottles are no longer in contact with plate 65', it snaps back into the vertical position shown in Figure 3. Conveyor 38 desirably is provided with a guide rail 66 which extends the length of this conveyor and is interrupted at 67 to permit movement of the transfer mechanism 31. Guide rail 37 of conveyor 25 is interrupted at 68 to permit movement of the transfer mechanism 30.

Disposed on opposite sides of the operator's seat 64 and straddling the case conveyor 31 are foot rests 69, 70 for the operator. The operator thus straddles the case conveyor 31. The cases are moved by this conveyor between the legs of the operator under his control in a position to receive a group or pattern of bottles accumulated against the stop plate 58. As best shown in Figure 3, the control mechanism for movement of the cases involves a rotatable shaft 71 suitably mounted in bearings above the cases 63 on conveyor 31. Fixed to this rotatable shaft are two sets of stop fingers 72 and 73 (Figure 1). Each set, as best shown in Figure 3, desirably comprises five fingers spaced approximately 72 degrees apart and carried by a hub keyed to the shaft 71. The two sets of fingers are positioned to move in the free space between two rows of bottles, as is indicated in Figure 1. By employing two sets of fingers with the fingers of each set arranged to project within the case in the free space between the two rows of bottles the pressure exerted on the fingers is minimized and breakage of the fingers is prevented.

In the position shown in Figure 3 the case stop mechanism is operative to prevent movement of the cases both filled and empty and thus position an empty case to receive a group or pattern of bottles accumulated against the stop plate 58. Once the empty case is filled with the bottles, the operator by depressing foot pedal 74 releases the stop mechanism so that the conveyor 31 carries the filled cases away from the filling station bringing another empty case into position to be filled. This is accomplished as follows—by depressing pedal 74, lever 75 is moved about its pivot 76 to actuate link 77 to move about its pivot 78 to pull down on connecting link 79, thus moving pawl 80 on link 81 pivoted at 82 in a downward direction so that it releases ratchet 83 keyed to shaft 71. With this ratchet released movement of the cases rotates the stop fingers 72 and 73, since the shaft 71 on which these fingers are mounted is no longer locked against rotation by the pawl 80. The stop fingers 72 and 73 are so spaced that a pair of fingers moves within an individual case, movement of the latter by the conveyor causing a succeeding pair of fingers to enter a succeeding case. When the operator releases the pressure on foot pedal 74, spring 84 restores the lever 75 to the position shown in Figure 3 causing the pawl 80 to engage the ratchet 83, locking shaft 71 against further rotation. In this position the stop fingers 72 and 73 engage the inner side of a case to prevent linear movement thereof by the conveyor 62, the latter, however, continuing its movement. The case which is held by the stop fingers 72 and 73 and all cases to the left of this case viewing Figure 3 are prevented from moving with the conveyor. The filled cases to the right of the case thus held move in frictional contact with the case conveyor to a suitable discharge point where they are removed from this conveyor.

Transfer of the pattern or grouping of bottles from conveyors 25 and 38 to a case 63 is desirably effected by the novel lifter mechanism shown in Figures 5 to 7, inclusive.

This lifter mechanism comprises a flat substantially rectangular plate 85 on the top of which supporting brackets 86, 87 are mounted in spaced relation. Fixed in these brackets are rods 88 and 89. Scissors-like links 91, 92; 93, 94; 95, 96; and 97, 98 extend through suitable openings in the plate 85. Links 91, 92 are pivoted on rod 89 at one end thereof and links 95, 96 are pivoted on this rod near the opposite end thereof, as clearly shown in Figure 5. Links 93, 94 are pivoted on rod 88 near one end thereof and links 97, 98 are pivoted on this rod near the opposite end thereof. A bar 99 connects the upper ends of links 91 and 93 for simultaneous movement of these two links. This bar 99 may be bolted or otherwise suitably secured to the upper ends of the links 91 and 93. In like manner, a bar 100 connects the upper ends of links 92 and 94 for simultaneous movement of both links about their pivots on rods 89 and 88. Similarly a bar 101 connects the upper ends of links 95, 97 and a bar 102 connects the upper ends of links 96 and 98.

A handle 103 is suitably secured as by bolts 103' to the upper ends of links 91 and 95. This handle extends in a general longitudinal direction relative to the longitudinal axis of the plate 85. A similar handle 104 is oppositely disposed to handle 103 and is connected, as, for example, by bolts 105' to the upper ends of links 94 and 98. The handles 103 and 104 are spaced apart a distance such that they can both be grasped by one hand and moved towards each other.

A coil spring 105 has one end secured to rod 88 and the other end to bar 100. A second coil spring 106 extends from the rod 89 to the bar 101. When the handles 103 and 104 are grasped and moved towards each other these springs 105 and 106 are placed under increased tension and function to restore the parts to the position shown in Figures 5 and 6 and in full lines in Figure 7 upon release of the pressure on the handles 103, 104.

Secured to the lower end of the links 92 and 96 is a clamp 107. A similar clamp 108 is secured to the lower ends of links 91, 95. A clamp 109 is suitably secured to the lower ends of links 94 and 98 and a clamp 110 to the lower ends of links 93, 97. Each of these clamps as best shown in Figure 6 comprises alternate curved portions 111 designed to engage the neck of a bottle and intermediate linear or straight connecting portions 112.

Clamps 107 and 108 cooperate with each other to firmly engage and hold the necks of three bottles when they are moved to the dotted line position shown in Figure 7. In like manner clamps 109 and 110 cooperate with each other to firmly engage and hold the necks of three bottles. Both clamps 108 and 110 through the links 95 and 97 connected by bar 101 and links 91 and 93 connected by bar 99 move in unison (viewing Figure 5) to the left. The other two clamps 107 and 109 move in unison to the right, viewing Figure 5, through the links 96 and 98 connected by bar 102 and links 92 and 94 connected by bar 100.

As best shown in Figure 7, the links 91 to 98, inclusive, extend below the plate 85 a distance such that when the plate is in contact with the top of the bottles, the clamps 107 to 110, inclusive, carried by these links are properly positioned to engage the necks of the bottles below the lips which are of somewhat greater external diameter than the necks.

A counter 115 is desirably positioned on a suitable support above the stop fingers 72 and is provided with a trip 116 engaged by each of the fingers 72 as it rotates past this trip. The counter shows the number of filled cases moved by the case conveyor, since each filled case effects movement of one of the stop fingers 72 to actuate the trip 116.

In the operation of the apparatus the capped and filled bottles are moved by the conveyor 25 in a single row to the transfer mechanism 30. The latter mechanism forms two parallel rows, one on conveyor 38 and the other on conveyor 25, the bottles in each row being spaced somewhat from each other in the vicinity of the transfer station 30. The two rows of bottles are moved by the conveyors 25 and 38 with the leading bottles into abutment with stop plate 58 forming a grouping of six bottles as shown in Figure 1.

The operator at station 64 places the lifter with the handles 103, 104 in the spread apart or full line position shown in Figure 7 so that the plate 85 rests on the tops of this grouping of six bottles. This automatically positions the clamps 107, 108, 109 and 110 so that the curved portions 111 are opposite the necks of these bottles. The operator then clenches his hand thus moving clamps 103 and 104 towards each other. This movement through the linkage hereinabove described causes the clamps 107 to 110, inclusive, to firmly grip the six bottles. The operator then simply moves this grouping of bottles through the opening 65 in the guide rail 37 downwardly into the case 63 positioned beneath the grouping of bottles abutting the stop plate 58. As soon as the grouping of bottles is removed, a new like grouping forms against the stop plate 58. The operator repeats his movement of placing the special lifter with the plate 85 in contact with the tops of these bottles then moves the handles 103 and 104 towards each other and continues the above described operation to place the second grouping of six bottles into the case to fill it. The operator then depresses the pedal 74 to permit the conveyor 31 to move the filled case and bring an empty case into filling position.

When the empty case reaches its desired position, the operator removes the pressure from the pedal 74. Under the influence of spring 84 and through the linkage 75, 77, 79 and 81, pawl 80 is brought into engagement with the ratchet 83 locking shaft 71 and the pair of stop fingers 72, 73 thereon against further rotation. These stop fingers thus prevent movement of the cases to the left of the fingers viewing Figure 3 and thus cause an empty case to be maintained in the desired filling position directly beneath the grouping of six bottles abutting stop plate 58.

It will be noted that in this invention it is only necessary to place the bottle lifter on the pattern or grouping of bottles accumulated contiguous to the stop plate 55, and then simply grasp the handles 103, 104 to move them towards each other. This action automatically firmly grasps the necks of the grouping of bottles, namely, six, in the embodiment of the invention shown in the drawings. The operator then simply has to lower the bottles into the empty case therebeneath. Thus, gravity aids the operator in his work. Upon release of pressure on the handles 103, 104, clamps 107 to 110, inclusive, automatically open. The movement of both the empty and filled cases is under the full control of the foot of the operator. Should excessive pressure be exerted by the bottles on the stop plate 58, the feed of further filled bottles is interrupted. This equipment, it has been found in practice, results in (1) a material reduction in the number of broken filled bottles, (2) substantially higher speed of filling cases per operator, and (3) a material reduction in the effort required by the operator to fill the cases, and this even though the operator's speed of filling the empty cases is greater.

Since certain changes may be made in the above construction and different embodiments of the invention could be made without departing from the scope thereof, it is intended that all matter contained in the above description or shown in the accompanying drawing shall be interpreted as illustrative and not in a limiting sense.

What is claimed is:

1. A bottle handling machine comprising, in combination, a bottle conveyor, a second bottle conveyor shorter than the first-mentioned bottle conveyor and disposed parallel and contiguous to said first-mentioned bottle conveyor, guide rails positioned to cause bottles fed by the first-mentioned conveyor to be moved so that the bottles are supported and carried by both of said conveyors, a transfer mechanism disposed contiguous to the terminal end of said guide rails, said transfer mechanism comprising a pair of rotating shafts each having mounted thereon for rotation therewith a series of three bottle-engaging rolls, the rolls on one shaft rotating in opposite direction from the rolls on the other shaft and the rolls on each shaft being spaced approximately 120 degrees apart with the rolls on both rotating shafts so disposed relative to each other that alternate bottles are caused to move on to one conveyor and the remaining bottles on to the other conveyor of said two conveyors thus producing two parallel rows of bottles, stop mechanism near the terminal end of said two conveyors against which the leading bottles of said two parallel rows of bottles are brought into abutment, a case conveyor movable in a direction at right angles to the direction of movement of said two conveyors beneath said two conveyors, an operator station located just above said case conveyor close to said stop mechanism, and stop mechanism for stopping the cases on said case conveyor so that an empty case is positioned under the control of the operator to receive bottles accumulating on said two conveyors.

2. A bottle handling machine comprising, in combination, a first bottle conveyor, a second bottle conveyor shorter than the first-mentioned bottle conveyor and disposed parallel and contiguous to said first-mentioned bottle conveyor, guide rails positioned to cause bottles fed by the first-mentioned conveyor to be moved so that the bottles are supported and carried by both of said conveyors, a transfer mechanism disposed contiguous to the terminal end of said guide rails, said transfer mechanism comprising a pair of rotating shafts each having mounted thereon for rotation therewith a series of three bottle-engaging rolls, the rolls on one shaft rotating in opposite direction from the rolls on the other shaft and the rolls on each shaft being spaced approximately 120 degrees apart with the rolls on both rotating shafts so disposed relative to each other that alternate bottles are caused to move on to one conveyor and the remaining bottles on to the other conveyor of said two conveyors thus producing two parallel rows of bottles, stop mechanism near the terminal end of said two conveyors against which the leading bottles of said two parallel rows of bottles are brought into abutment, a case conveyor movable in a direction at right angles to the direction of movement of said two conveyors beneath said two conveyors, stop mechanism for stopping the cases on said case conveyor so that an empty case is positioned under the control of an operator to receive bottles accumulating on said two conveyors, said two conveyors being provided with guide rails on the opposite sides thereof, the guide rail on the side closest to the operator station being broken away to provide an opening through which the accumulation of bottles may be moved into a case, means for supplying filled and capped bottles to the first bottle conveyor, a motor for driving said supplying means, and switch mechanism under control of the stop mechanism in circuit with said motor arranged to stop the operation of said motor when the pressure of the bottles on said stop mechanism exceeds a predetermined pressure.

3. A bottle handling machine comprising, in combination, a first bottle conveyor; a second bottle conveyor shorter than the first bottle conveyor and disposed parallel and contiguous to said first bottle conveyor; guide rails positioned to cause bottles fed by the first bottle conveyor to be moved so that the bottles are supported and carried by both of said conveyors; a transfer mechanism disposed contiguous to the terminal end of said guide rails, said transfer mechanism comprising a pair of rotating shafts each having mounted thereon, for rotation therewith, a series of three bottle engaging rolls, the rolls of one shaft rotating in opposite directions from the rolls on the other shaft, and the rolls of each shaft being spaced approximately 120° apart, with the rolls on both rotating shafts so disposed relative to each other that alternate bottles are caused to move onto one conveyor and the remaining bottles onto the other conveyor of said two conveyors, thus producing two parallel rows of bottles; stop mechanism near the terminal ends of said two conveyors against which the leading bottles of said two parallel rows of bottles are brought into abutment; a case conveyor movable in close proximity to said two conveyors; an operator station located just above said case conveyor, close to said stop mechanism; and stop mechanism for stopping the cases on said case conveyor so that an empty case is positioned under the control of the operator to receive bottles accumulating on said two conveyors.

4. A bottle handling machine comprising, in combination, a first bottle conveyor; a second bottle conveyor disposed parallel and contiguous to said first bottle conveyor; guide rails positioned to cause bottles fed by the first mentioned conveyor to be moved so that the bottles are supported and carried by both of said conveyors in a single row; a transfer mechanism disposed contiguous to the terminal end of said guide rails, said transfer mechanism comprising a pair of rotating shafts, each having mounted thereon for rotation therewith a plurality of spaced bottle engaging rolls, which rolls on both rotating shafts are so disposed relative to each other that some bottles of said single row are caused to move onto one conveyor and other bottles onto the other conveyor, thus producing a plurality of parallel rows of bottles; stop mechanism near the terminal end of said two conveyors cooperating therewith to stop movement of the leading bottles of each of said parallel rows, said conveyors affecting movement of succeeding bottles into abutting engagement with preceding bottles movement of which has been stopped by said stop mechanism, to produce a predetermined grouping of bottles in a plurality of rows with the bodies of the bottles in each row in abutting relation; a case conveyor movable in close proximity to said conveyors; an operator station located just above said case conveyor, close to said stop mechanism; and stop mechanism for stopping the cases on said case conveyor so that an empty case is positioned under the control of the operator to receive said predetermined grouping of bottles.

5. A bottle handling machine comprising, in combination, a first bottle conveyor for moving a single row of bottles; a second bottle conveyor disposed parallel and contiguous to the first bottle conveyor; a transfer mechanism arranged to move some of the bottles carried by the first bottle conveyor onto the second bottle conveyor, thus producing a plurality of parallel rows of bottles, with the bottles in each row in spaced relationship, said transfer mechanism comprising a pair of rotating shafts each having mounted thereon for rotation therewith a plurality of bottle engaging rolls, with the rolls on both rotating shafts so disposed relative to each other that contiguous bottles carried by the first conveyor are caused to move in parallel rows on both of said conveyors, with the bottles in said rows in spaced relation relative to each other; stop mechanism near the terminal end of said conveyors cooperating with said conveyors to stop movement of the leading bottles of said parallel rows, said conveyors operating to move the succeeding bottles into abutting engagement with preceding bottles to produce a predetermined grouping of bottles in a plurality of rows, with the bodies of the bottles in each row in said grouping in abutting relation; and a case conveyor movable in close proximity to said conveyors, beneath said conveyors, to bring empty cases into bottle loading position and move the full cases away from said bottle loading position; and means for stopping movement of said cases when in said bottle loading position to permit movement of said predetermined grouping of bottles into a case on said conveyors.

References Cited in the file of this patent

UNITED STATES PATENTS

| | | |
|---|---|---|
| 1,348,341 | Winkley | Aug. 3, 1920 |
| 1,611,822 | Dulche | Dec. 21, 1926 |
| 2,036,421 | Luckie | Apr. 7, 1936 |
| 2,119,767 | Anderson | June 7, 1938 |
| 2,385,997 | Leggett et al. | Oct. 2, 1945 |
| 2,386,859 | Hutaff, Jr. | Oct. 16, 1945 |